US010665940B2

(12) United States Patent
Russell et al.

(10) Patent No.: US 10,665,940 B2
(45) Date of Patent: May 26, 2020

(54) ANTENNA ARRAY FOR AERONAUTICAL COMMUNICATIONS

(71) Applicant: AERONET GLOBAL COMMUNICATIONS LABS DAC, Dublin (IE)

(72) Inventors: Brian Russell, Dublin (IE); Ronan Farrell, Dublin (IE)

(73) Assignee: AERONET GLOBAL COMMUNCATIONS LABS DAC, Dublin (IE)

( * ) Notice: Subject to any disclaimer, the term of this patent is extended or adjusted under 35 U.S.C. 154(b) by 0 days.

(21) Appl. No.: 16/077,462

(22) PCT Filed: Feb. 13, 2017

(86) PCT No.: PCT/EP2017/053175
§ 371 (c)(1),
(2) Date: Aug. 11, 2018

(87) PCT Pub. No.: WO2017/137633
PCT Pub. Date: Aug. 17, 2017

(65) Prior Publication Data
US 2019/0044228 A1    Feb. 7, 2019

Related U.S. Application Data

(60) Provisional application No. 62/294,536, filed on Feb. 12, 2016.

(30) Foreign Application Priority Data

Feb. 19, 2016  (EP) ..................................... 16156608

(51) Int. Cl.
*H01Q 3/24* (2006.01)
*H01Q 25/00* (2006.01)
(Continued)

(52) U.S. Cl.
CPC ............. *H01Q 3/247* (2013.01); *G01S 1/042* (2013.01); *G01S 1/045* (2013.01); *H01Q 3/24* (2013.01); *H01Q 5/40* (2015.01); *H01Q 25/002* (2013.01)

(58) Field of Classification Search
CPC ........ H01Q 3/247; H01Q 25/002; H01Q 5/40; G01S 1/042; G01S 1/045
(Continued)

(56) References Cited

U.S. PATENT DOCUMENTS 6,292,134 B1   9/2001  Bondyopadhyay
6,922,445 B1   7/2005  Sampath et al.
(Continued)

OTHER PUBLICATIONS

PCT/EP2017/053175. International Search Report & Written Opinion (dated May 18, 2017).

*Primary Examiner* — Brian K Young
(74) *Attorney, Agent, or Firm* — Loza & Loza, LLP; Anthony G. Smyth

(57) ABSTRACT

The invention is for a system and method of constructing an array of fixed antennas to provide coverage for radio communications to multiple mobile aerial vehicles from a terrestrial location. In one embodiment there is provided antenna system providing radio communications to a plurality or moving aerial vehicles, said system comprising an array of fixed antennas; at least one or a plurality of transceivers selectively connected to the array of fixed antennas; and a control unit configured to switch individual antennas from said array to connect with at least one transceiver. The control unit is configured with a switch matrix to control the connections from the antennas to the plurality of transceivers to implement a desired communications protocol, and the system is further configurable to supply exclusion policies to the control unit which identify which antennas are not to be connected to the switch matrix.

19 Claims, 4 Drawing Sheets

(51) Int. Cl.
*H01Q 5/40* (2015.01)
*G01S 1/04* (2006.01)

(58) Field of Classification Search
USPC .......................................................... 343/876
See application file for complete search history.

(56) References Cited

U.S. PATENT DOCUMENTS

| | | |
|---|---|---|
| 6,961,025 B1 | 11/2005 | Chethik et al. |
| 8,817,650 B2 * | 8/2014 | Guo ..................... H04B 7/0602 370/252 |
| 10,355,351 B2 * | 7/2019 | Cummings ............... G01S 3/42 |
| 10,361,765 B2 * | 7/2019 | Seol ..................... H04B 7/0686 |
| 10,404,333 B2 * | 9/2019 | Zhang ................... H04B 7/063 |
| 2007/0191013 A1 | 8/2007 | Gunnarsson et al. |
| 2009/0186611 A1 | 7/2009 | Stiles et al. |

* cited by examiner

ANTENNA ARRAY FOR AERONAUTICAL COMMUNICATIONS

CROSS-REFERENCE TO RELATED APPLICATIONS

This application is the U.S. National Stage of International Patent Application No. PCT/EP2017/053175 filed on Feb. 13, 2017, which claims the benefit of priority from EP Patent Application No. 16156608.8 filed Feb. 19, 2016 and U.S. Provisional Patent Application No. 62/294,536 filed Feb. 12, 2016, the disclosures of the foregoing applications being incorporated herein by reference in their entirety for all applicable purposes.

FIELD

The invention relates to an antenna array for use in aeronautical communications.

BACKGROUND

Antenna systems are used widely in aeronautical communications. It is desirable to provide a high antenna gain for maintaining a radio communications link with an aircraft or UAV when travelling in air.

U.S. Pat. No. 6,292,134 discloses a geodesic sphere phased array antenna system which is capable of scanning the entire omni-directional communication space and comprises a substantially equilateral triangular planar subarrays of antenna elements arranged in a geodesic sphere configuration. However, this communications space does not take into consideration static and dynamic terrestrial and satellite interference constraints.

US Patent Publication No. US 2009/186611 discloses an aircraft broadband wireless system and method which includes a plurality of spaced-apart ground stations for transmitting and receiving signals to and from a respective plurality of aircraft. The broadband wireless system may also include a network operations center in communication with each of the ground stations via a global communications network. However, similar to U.S. Pat. No. 6,292,134, this communication system is not adapted to modify its functionality in view of static and dynamic interference constraints.

It is an object to provide an improved antenna array system and method for use in aeronautical communications.

SUMMARY

According to the invention there is provided, as set out in the appended claims, a system providing radio communications to a plurality of moving aerial vehicles, said system comprising an array of fixed antennas; at least one or a plurality of transceivers selectively connected to the array of fixed antennas; and a control unit configured to switch individual antennas from said array to connect with at least one transceiver; wherein the control unit is configured with a switch matrix to control the connections from the antennas to the plurality of transceivers to implement a desired communications protocol, and wherein the system is further configurable to supply exclusion policies to the control unit which identify which antennas are not to be connected to the switch matrix.

In one embodiment the system is configured to maintain a high antenna gain for maintaining a radio communications link with said moving aerial vehicle.

In one embodiment the control unit is configured with a policy control to identify optimal connections between said antennas and the at least one or plurality of transceivers to implement dynamic beam shaping.

In one embodiment the control unit is configured with a switch matrix to control the connections from the antennas to the plurality of transceivers to implement a desired communications protocol.

In one embodiment the array of antennas comprises a first antenna operating at a first polarity and a second antenna operating at a second polarity.

In one embodiment individual antenna are selected to provide radio communications to an aerial vehicle in a single area or location.

In one embodiment the array of antennas comprises a first antenna operating at a first frequency and a second antenna operating at a second frequency.

In on embodiment the array of antennas comprises a first antenna operating at a first beamwidth and a second antenna operating at a second beamwidth.

In one embodiment there is provided at least one sensor connected to at least one antenna and configured to measure the quality of an incoming signal of at least one antenna.

In one embodiment there is provided a method for ensuring high antenna gain for maintaining a radio communication link to an aircraft using angular combination.

In one embodiment there is provided a method for switching between multiple antennas and a transceiver to ensure optimal antenna performance from the perspective of the individual aircraft and for overall network performance, using received signal sensed information, plane locations and other network level information.

In one embodiment there is provided a policy driven decision unit for identifying the connections between antennas and transceivers which can implement dynamic beam shaping.

In one embodiment there is provided a method for construction the antenna array such as to prevent interference in this parts of the visible sky.

In one embodiment the plurality of antennas are of the same construct that may have different performances—such as polarity, frequency range or beamwidth.

In another embodiment there is provided a method of providing radio communications to a plurality or moving aerial vehicles, said method comprising the step of:
  arranging an array of fixed antennas;
  selectively connecting at least one or a plurality of transceivers to the array of fixed antennas; and
  switching individual antennas from said array to connect with at least one transceiver; and wherein the method further comprises the step of supplying exclusion policies which identify which antennas from said array are not to be connected.

In another embodiment there is provided a method of providing radio communications to a plurality of moving aerial vehicles, said method comprising the step of:
  arranging an array of fixed antennas;
  selectively connecting at least one or a plurality of transceivers to the array of fixed antennas; and
  switching individual antennas from said array to connect with at least one transceiver.

There is also provided a computer program comprising program instructions for causing a computer program to carry out the above method which may be embodied on a record medium, carrier signal or read-only memory.

In another embodiment there is provided an antenna system providing radio communications to a plurality of moving aerial vehicles, said system comprising an array of fixed antennas; at least one or a plurality of transceivers selectively connected to the array of fixed antennas; and a control unit configured to switch individual antennas from said array to connect with at least one transceiver.

In one embodiment the exclusion policies capture dynamic exclusion events.

In one embodiment an exclusion policy identifies those antennas to be configured as unavailable to the antenna system for transmission or reception at a particular time period.

In one embodiment the exclusion policy identifies those antennas which have been determined to cause interference with a primary user.

In one embodiment an antenna is determined as causing interference with a primary user if a primary user is located within the beamwidth of the antenna.

In one embodiment the determination is made from a dynamically generated database containing information associated with each primary user and the locations and pointing angles of each of the antennas.

In one embodiment the information associated with each primary user comprises the location of the primary user and the frequency bands to which the primary user has priority access.

In one embodiment a primary user comprises a ground to air radio communication system.

In one embodiment the exclusion policy identifies those antennas which have been determined to be not required for communications with authorised users.

In one embodiment the determination is made from a dynamically generated database containing the location of each authorised user and the locations and pointing angles of each of the antennas.

In one embodiment an authorised user comprises a valid moving aerial vehicle.

BRIEF DESCRIPTION OF THE DRAWINGS

The invention will be more clearly understood from the following description of an embodiment thereof, given by way of example only, with reference to the accompanying drawings, in which.

DETAILED DESCRIPTION OF THE DRAWINGS

The invention is for a method of constructing an array of fixed antennas to provide coverage for radio communications to multiple mobile aerial vehicles from a terrestrial location. The invention constructs a surface covering the visibility of the sky that needs to be covered using a number of static antennas. This array of static antennas can be connected to a switch matrix that will allow specific antennas to be connected to a number of transceivers that will implement a communications protocol. The selection of the antennas to be connected to the transceivers will be determined by a decision unit, the operation of which is described in further detail below.

Figure 1:
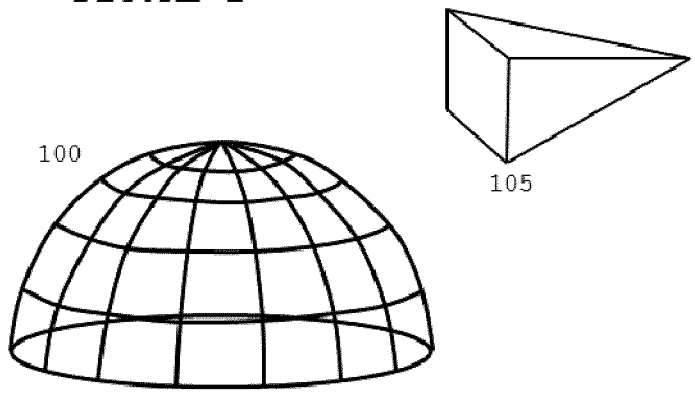
FIG. 1 illustrates an array of individual fixed antennas (105) placed in a pattern to form a surface (100), for example a dome, matching the angles of the sky that need to have antenna coverage. The individual antennas may or may not be of the same size or performance.

FIG. 1 illustrates an array of individual fixed antennas (105) placed in a pattern to form a surface (100), for example a dome, matching the angles of the sky that need to have antenna coverage. The individual antennas may or may not be of the same size or performance. This invention provides a means for achieving high gain antenna coverage over a wide area of the sky without the need for mechanically moving parts or the use of active antenna systems. The aggregation of antennas achieves overall beam coverage due to angular and spatial combination of separate focussed beams.

Figure 2:
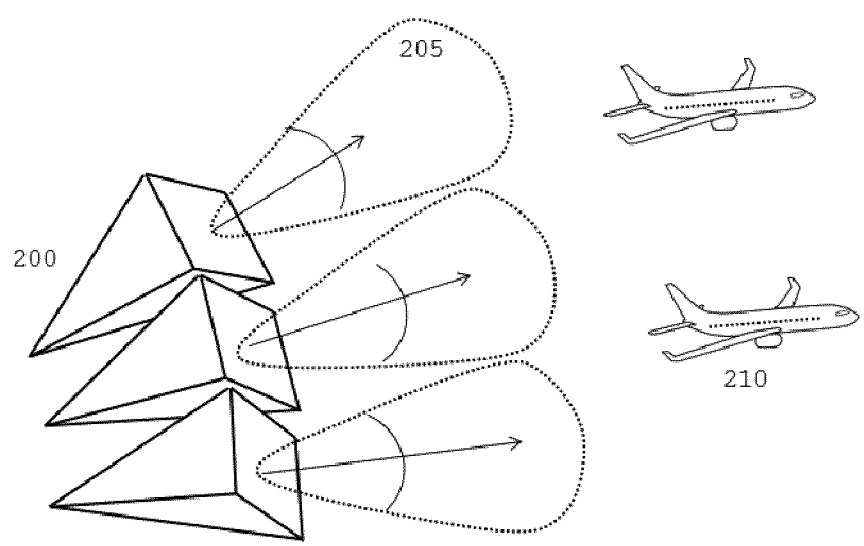
FIG. 2 shows positioning of the individual antennas (200) is such that the field of view (3 dB gain bandwidth) (205) of the antenna provides full coverage of the sky where one or more aircraft (210) may be present.

The invention encompasses any surface but for purposes of description a hemisphere shape is described with respect to FIG. 1. The surface can be constructed from a number of fixed antennas which may be of various shapes, though the most common shapes are those with rectangular or circular openings. These individual antennas are placed adjacent to each other at a small angle so as to form the surface. FIG. 2 shows positioning of a plurality of individual antennas (200) arranged such that such that the field of view (3 dB gain bandwidth) (205) of the antenna provides full coverage of the sky where one or more aircraft (210) may be present.

The requirement on the antenna is that the field of view of the antenna, or angular beamwidth, is larger than the arc of the surface being occupied by the antenna. This is required so that the field of view of each antenna sufficiently overlaps to ensure that all parts of the visible sky are fully covered by a least one antenna. As higher gain systems tend to have smaller angular beamwidth, a high gain antenna array would require more individual antenna elements.

It will be appreciated that provided that the requirement of full coverage of the field of view is satisfied, there is no requirement for each of the antennas to be of the same size or performance. The gain and beamwidth requirements for different parts of the sky may vary, thus necessitating a different selection of antennas for the varying locations on the antenna surface.

An advantage of this approach is that if multiple aircraft are in view of the antenna array, they are likely to be in view of different antenna elements and thus will not cause interference. This is a form of spatial separation but based on angular position with respect to the antenna array. Performance can be enhanced by utilising antennas of different polarities covering the same area of sky. Through the use of different polarities, additional aircraft may be supported without interference.

Figure 3:
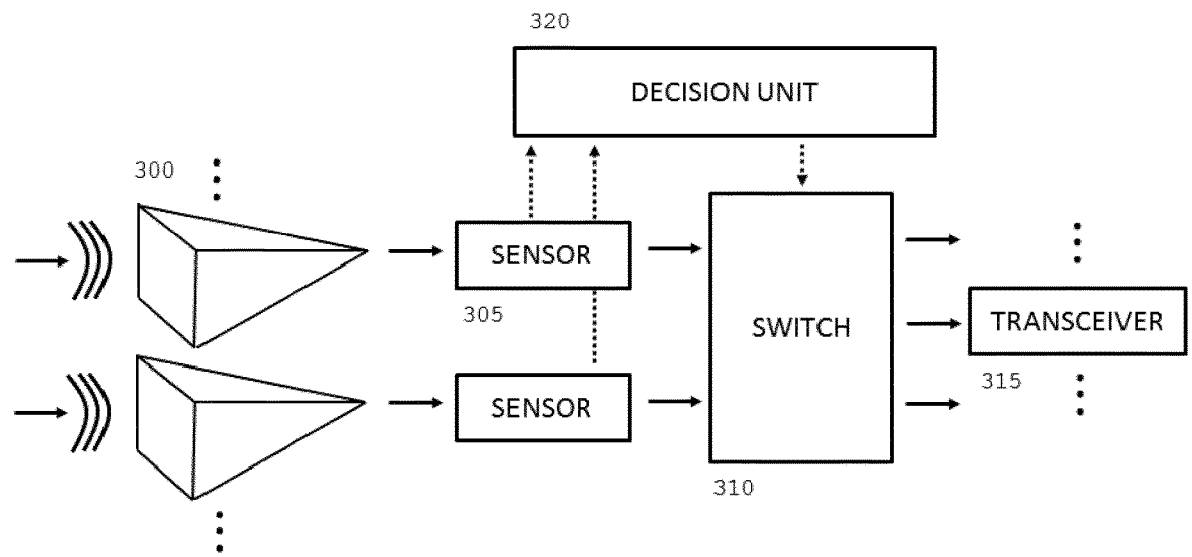
FIG. 3 represents the reception of a radio signal. The architecture remains equivalent for signal transmission with the exception of the received signal sensors (305). The individual elements of the antenna array (300) will receive the radio signal and this received signal will be passed to a sensor (305) and to the switch (310). The decision unit (320) will take information from multiple sources, including the received signal sensor, and identify the correct connection between one or more antennas to one or more transceivers.

FIG. 3 illustrates a sample operation of the invention on reception of a radio signal. The architecture remains equivalent for signal transmission. It comprises a plurality of received signal sensors (305). The individual elements of the antenna array (300) will receive the radio signal and this received signal will be passed to a sensor (305) and to a switch (310). A decision unit (320) will take information from multiple sources, including the received signal sensor, and identify the correct connection between one or more antennas to one or more transceivers.

It is possible to utilise this array structure such that each antenna element has its own dedicated transceiver system. The transceiver both receives and transmits modulated radio signals, undertaking the conversion between digital and radio signals. These individual transceivers can then be aggregated in the digital domain. In the present invention, the architecture can utilise an intelligent switch matrix. The signals from the antennas are then passed to the switch matrix. The switch matrix is connected to one or more antennas and to one or more transceivers. The switch matrix can connect an antenna to a transceiver and seamlessly switch connections. The switch matrix is directed by a decision unit as to which antenna to connect to which transceiver. This decision may be informed by the known position of an aircraft, or in response to an incoming signal from an aircraft.

In this architecture the individual antenna elements are each connected to a sensor that can measure the quality of the incoming signals coming to each individual antenna element. The quality metric may include issues such as interference, noise or signal strength. This information is passed to the decision unit. This enables the decision unit to identify the optimal antenna element to be connected to the transceiver to manage the communication to that aircraft. The decision of the decision unit may be further controlled by the use of policies for antenna selection and on overall network performance. In cases where it is necessary to change the antenna in use, the switch can be configured to preserve the data link using the same transceiver system and just a different antenna. This will minimise service disruption.

An additional advantage of this switched antenna approach is that interferers, for example other users or non-cooperative sources, can be avoided by deselecting the antennas representing the angles of arrival for those signals.

In the dynamic scenario where an aircraft is moving, it may leave the field of view of the antenna to which it is assigned. In that scenario, it will begin to be received by the adjacent antennas with the field of view covering the new aircraft location. The sensors on each channel can dynamically evaluate the incoming signal and inform the decision unit. The decision unit can then request the switch matrix to switch the transceiver to the new antenna. In this way, the optimal antenna is always chosen. This approach replaces complex algorithms for direction of arrival assessment and subsequent beam pointing (electronic or mechanical) with a simpler combination of quantitative sensor readings and selection policies.

Figure 4:
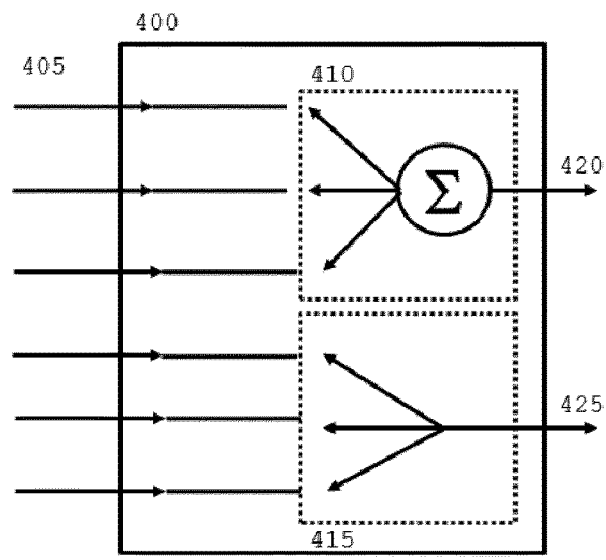
FIG. 4 represents the contents of the switch (400). The signal paths are invertible but for illustration purposes the figure is shown with received signals (405). Inside the switch there are two functionalities. The first functionality is a combiner/splitter (410) that connects the transceiver-side port (420) to one or more antenna ports from a range of possible antenna connections. The second functionality connects the transceiver-side port (425) with only one of a number of possible antenna connections (415)

An addition to the system and method of the invention is the use of a combiner that connects multiple inputs to a combining stage (or splitter if used in reverse), and that is connected to a single output. This allows a number of antennas to collaborate to increase overall antenna performance. FIG. 4 represents the contents of the switch (400). The signal paths are invertible, but for illustration purposes the figure is shown with received signals (405). Inside the switch there are two functionalities. The first functionality is a combiner/splitter (410) that connects the transceiver-side port (420) to one or more antenna ports from a range of possible antenna connections. The second functionality connects the transceiver-side port (425) with only one of a number of possible antenna connections (415).

The surface being constructed from the number of fixed antennas may cover the full sky. There may however be cases where certain angles of view need to be excluded. These may be sources of interference for incoming transmissions, or may be regions of the sky where radio emissions are disallowed—for example interference with terrestrial or satellite users. In these cases, regions in the surface may not be constructed with antennas, to ensure that there is no antenna gain in those directions. As overall antenna array performance is by angular combination of focussed beams, the precision of the aggregate beamshaping is dependent on the beamwidths of the adjacent individual antenna elements.

Where the interference is not stationary, it is possible to generate equivalent behaviour by supply policies to the decision unit. These policies will identify which antennas cannot be connected to the switch and thus are effectively removed from the array. These exclusion policies may include a time element to capture dynamic exclusion events—for example the path of a satellite.

Accordingly, in one embodiment of the invention, the antenna system is configured to supply an exclusion policy to the control or decision unit which prevents the system from interfering with radio communication systems between ground and airborne locations where directional radio systems are being used. The exclusion policy can also take into account unwanted sources of interference. Embodiments of the invention describing these exemplary exclusion events are described in more detail in the paragraphs below.

Figure 5:
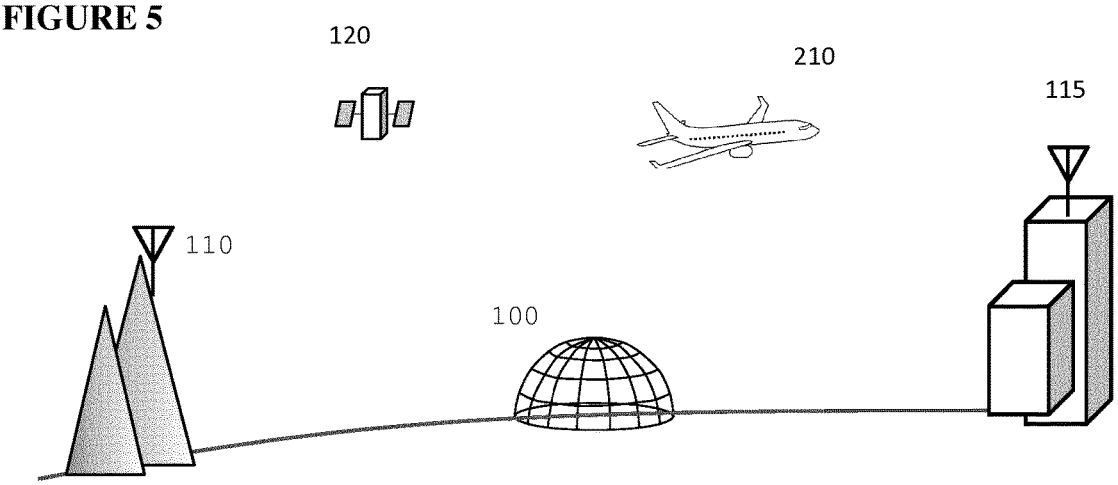
FIG. 5 illustrates a ground based communication system in communication with a primary user such as a satellite system or an aircraft, and in view of which the supply policy of the present invention can be configured to prevent interference to the primary user from such competing radio signals and ensure compliance with legal requirements.

A first exclusion event which may be covered by the antenna system of the present invention thus concerns directional communication systems broadcasting towards a high priority user of the radio spectrum who has legal protection against interference, known as a primary user. In the arena of ground to air communications, such a primary user could be for example a satellite system or an aircraft that is in the line of sight of a ground based system that may come into view at low pointing angles. This may be due to an antenna of the ground based system being placed at a high geographic location (for example on a hill or a mountain), or being placed on top of a tall building. This is illustrated in FIG. 5, where an antenna located on the top of a mountain (110) is shown as being in the line of sight with a satellite (120), while an antenna located on the top of a tall building (115) is shown as being in the line of sight of an aircraft (210). In this case, the system (100) can be configured to prevent its antennas causing interference during communications between a primary user, such as the satellite (120) or the aircraft (210), and an antenna (110; 115) of a ground based system, and thus ensuring compliance with legal requirements.

In order to prevent the communication system of the invention interfering with primary users, a database of primary users may be generated. The database comprises information associated with primary users. This information includes the locations of the primary users and the frequency bands to which they have priority access. The database will also consist of locations and pointing angles with respect to the antenna system. It should be understood that this database must contain a dynamic element, as the position of satellites in non-geostationary orbits will be dynamic.

Figure 6:
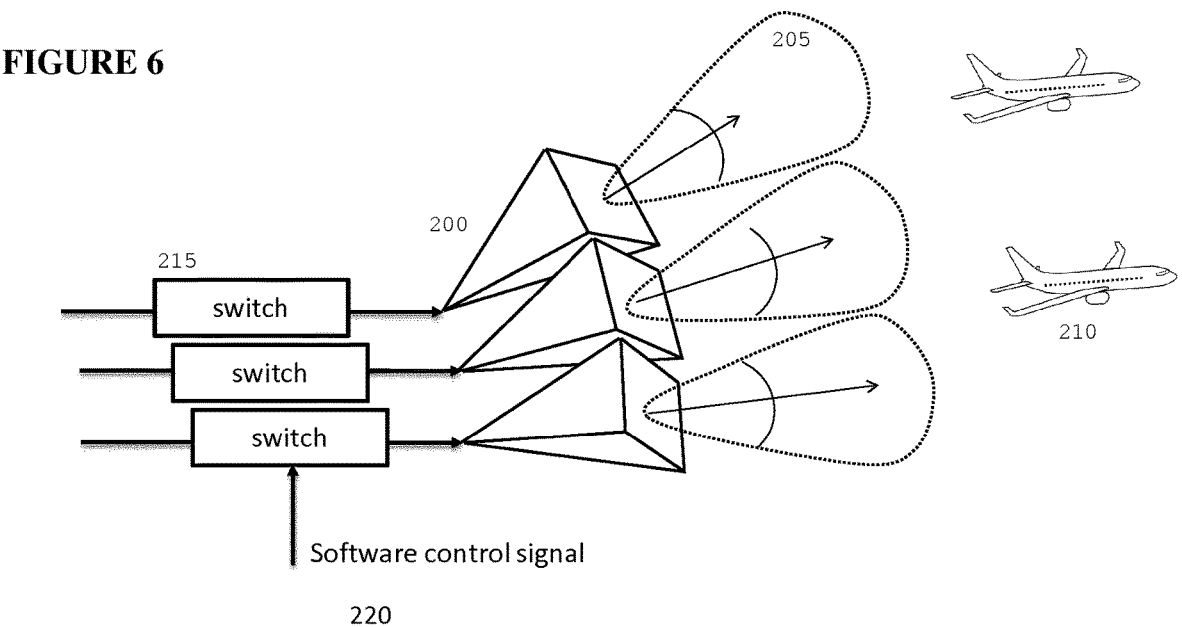
FIG. 6 illustrates an embodiment of the invention where a switch is configurable to disconnect an antenna from the antenna array which may interfere with a primary user.

To determine which antennas in the antenna array may cause interference to a primary user at a particular point in time, the beamwidth of each of the antenna elements in the antenna array is calculated. A determination is then made as to whether any primary user is located within the beamwidth of one or more of the antennas in the array. If it is determined that a primary user is located in a beamwidth of one or more of the antennas, an exclusion policy can then be supplied to the decision unit identifying those antennas to be configured as unavailable to the antenna system for transmission, in order to avoid these antennas causing interference to the primary user. This configuration may be implemented by software selection, or by including a software controlled switch that physically disconnects the antenna from the array. This embodiment is illustrated in FIG. 6, where it can be seen that a software control signal (220) may be sent to configure one or more of the switches (215) coupled to each antenna (200). This control signal acts on the selected switches to disconnect those antennas (200) from the array which have been determined to have a beamwidth (205) which may interfere with a primary user in the form of an aircraft (210).

In the case of dynamic users such as aircrafts or satellites, it will be appreciated that the list of antennas that need to be isolated will change. Thus, an active decision loop can dynamically turn on and off the relevant antennas as required.

A second exclusion event which may be covered by the antenna system of the present invention relates to interference from other users who may intentionally or unintentionally be generating radio signals that may impact on the correct operation of the communication system. Such interference tends to degrade the achievable data rate performance, and in extreme cases can collapse the radio link in a form of denial-of-service attack.

Figure 7:
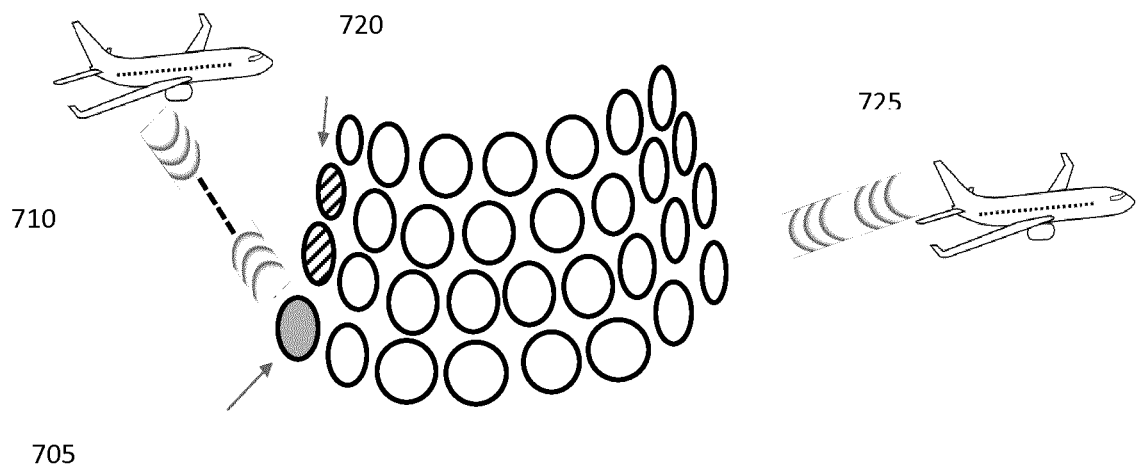
FIG. 7 provides an exemplary illustration of how the antenna system of the present invention can mitigate unwanted interference.

FIG. 7 provides an exemplary illustration of how the antenna system of the present invention can mitigate interference caused by un-authorised users, such as an unauthorised aircraft (725) communicating with the antenna array, and thus ensure optimal communications with authorised users, such as an authorised aircraft (715). In one embodiment of the invention, a database is maintained which contains the location of legitimate and authorised users, such as the valid aircraft user (715). The system then determines from this location information the subset of antenna elements (705) in the array that are required to communicate (710) with the authorised users. An exclusion policy can then be supplied to the decision unit identifying those antennas in the array which are not required, and thus be configured to be switched off. This prevents interfering signals from being received from un-authorised users such as the aircraft (725) if they originate from other angles.

As an aircraft is moving, it is possible to predict its near future locations. This will allow the prediction of future antenna elements (720) of the antenna array that will be required to maintain connectivity. In effect, as an aircraft passes the field of view of the antenna array, a small number of antennas will be activated as necessary to capture the aircraft communications. This small group of antennas will accordingly migrate across the antenna array as the aircraft flies overhead. It will be appreciated that this approach minimises unintentional interference and enhances protection against malicious interference.

The decision to switch the communication from one antenna to the next available and allowable antenna can be decided by a variety of performance metrics. An example would be one based on received signal strength. However, it will further be appreciated that the decision unit may also factor in other parameters, such as for example current or predicted congestion, locked-out antenna elements, or geographical constraints.

The embodiments in the invention described with reference to the drawings comprise a computer apparatus and/or processes performed in a computer apparatus. However, the invention also extends to computer programs, particularly computer programs stored on or in a carrier adapted to bring the invention into practice. The program may be in the form of source code, object code, or a code intermediate source and object code, such as in partially compiled form or in any other form suitable for use in the implementation of the method according to the invention. The carrier may comprise a storage medium such as ROM, e.g. CD ROM, or magnetic recording medium, e.g. a memory stick or hard disk. The carrier may be an electrical or optical signal which may be transmitted via an electrical or an optical cable or by radio or other means.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention is not limited to the embodiments hereinbefore described but may be varied in both construction and detail.

The invention claimed is:

1. An antenna system providing radio communications to a plurality of moving aerial vehicles, said system comprising:
   an array of fixed antennas;
   at least one or a plurality of transceivers selectively connected to the array of fixed antennas; and
   a control unit configured to switch individual antennas from said array to connect with at least one transceiver, wherein the control unit is configured with a switch matrix to control the connections from the antennas to the plurality of transceivers to implement a desired communications protocol, and
   wherein the system is further configurable to supply exclusion policies to the control unit which identify which antennas are not to be connected to the switch matrix.

2. The antenna system of claim 1, wherein the exclusion policies capture dynamic exclusion events.

3. The antenna system of claim 1, wherein an exclusion policy identifies those antennas to be configured as unavailable to the antenna system for transmission or reception at a particular time period.

4. The antenna system of claim 3, wherein the exclusion policy identifies those antennas which have been determined to cause interference with a primary user.

5. The antenna system of claim 4, wherein an antenna is determined as causing interference with a primary user if a primary user is located within the beamwidth of the antenna.

6. The antenna system of claim 4, wherein the determination is made from a dynamically generated database containing information associated with each primary user and the locations and pointing angles of each of the antennas.

7. The antenna system of claim 6, wherein the information associated with each primary user comprises the location of the primary user and the frequency bands to which the primary user has priority access.

8. The antenna system of claim 4, wherein a primary user comprises a ground to air radio communication system.

9. The antenna system of claim 3, wherein the exclusion policy identifies those antennas which have been determined to be not required for communications with authorised users.

10. The antenna system of claim 9, wherein the determination is made from a dynamically generated database containing the location of each authorised user and the locations and pointing angles of each of the antennas.

11. The antenna system of claim 10, wherein an authorised user comprises a valid moving aerial vehicle.

12. The antenna system of claim 1, wherein the system is configured to maintain a high antenna gain for maintaining a radio communications link with said moving aerial vehicle.

13. The antenna system of claim 1, wherein the control unit is configured with a policy control to identify optimal connections between said antennas and the at least one or plurality of transceivers to implement dynamic beam shaping.

14. The antenna system of claim 1, wherein the array of antennas comprises a first antenna operating at a first polarity and a second antenna operating at a second polarity.

15. The antenna system of claim 1, wherein an individual antenna is selected to provide radio communications to an aerial vehicle in a single area or location.

16. The antenna system of claim 1, wherein the array of antennas comprises a first antenna operating at a first frequency and a second antenna operating at a second frequency.

17. The antenna system of claim 1, wherein the array of antennas comprises a first antenna operating at a first beamwidth and a second antenna operating at a second beamwidth.

18. The antenna system of claim 1, comprising at least one sensor connected to at least one antenna and configured to measure the quality of an incoming signal of at least one antenna.

19. A method of providing radio communications to a plurality of moving aerial vehicles, said method comprising the step of:
    arranging an array of fixed antennas;
    selectively connecting at least one or a plurality of transceivers to the array of fixed antennas;
    switching individual antennas from said array of fixed antennas to connect with at least one transceiver; and
    supplying exclusion policies which identify which antennas from said array of fixed antennas are not to be connected.

\* \* \* \* \*